US009091225B2

(12) United States Patent
Kim (10) Patent No.: US 9,091,225 B2
(45) Date of Patent: Jul. 28, 2015

(54) SYSTEM AND METHOD FOR CONTROLLING THE NUMBER OF PILOT INJECTIONS (75) Inventor: Youngho Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 1218 days.

(21) Appl. No.: 12/958,095

(22) Filed: Dec. 1, 2010

(65) Prior Publication Data
US 2012/0065869 A1 Mar. 15, 2012

(30) Foreign Application Priority Data
Sep. 14, 2010 (KR) ........................ 10-2010-0090132

(51) Int. Cl.
F02D 41/40 (2006.01)
F02D 41/04 (2006.01)
F02D 41/10 (2006.01)

(52) U.S. Cl.
CPC ............ F02D 41/045 (2013.01); F02D 41/403 (2013.01); F02D 41/10 (2013.01); Y02T 10/44 (2013.01)

(58) Field of Classification Search
CPC ... F02D 41/045; F02D 41/403; F02D 41/402; F02D 45/02; F02B 3/06
USPC .......... 701/102, 103, 105, 110; 123/299, 300, 123/492, 304, 305
See application file for complete search history.

(56) References Cited

U.S. PATENT DOCUMENTS

| 4,621,599 | A  | * | 11/1986 | Igashira et al. | 123/300 |
|---|---|---|---|---|---|
| 4,767,959 | A  | * | 8/1988 | Sakakibara et al. | 310/317 |
| 5,090,379 | A  | * | 2/1992 | Ito | 123/299 |
| 5,255,655 | A  | * | 10/1993 | Denz et al. | 123/479 |
| 6,390,082 | B1 | * | 5/2002 | Duffy et al. | 123/682 |
| 6,412,469 | B1 | * | 7/2002 | Itoyama et al. | 123/299 |
| 6,748,920 | B2 | * | 6/2004 | Ito et al. | 123/299 |
| 7,337,767 | B2 | * | 3/2008 | Magarida et al. | 123/486 |
| 7,532,971 | B2 | * | 5/2009 | Sasaki et al. | 701/102 |
| 7,831,370 | B2 | * | 11/2010 | Kuronita et al. | 701/103 |
| 8,448,625 | B2 | * | 5/2013 | Mori et al. | 123/299 |
| 2002/0195081 | A1 | * | 12/2002 | McGee et al. | 123/299 |
| 2003/0106531 | A1 | * | 6/2003 | Saeki et al. | 123/435 |

(Continued)

FOREIGN PATENT DOCUMENTS

EP 1 741 911 A1 1/2007
EP 2 083 160 A1 11/2007

(Continued)

Primary Examiner — Lindsay Low
Assistant Examiner — George Jin
(74) Attorney, Agent, or Firm — Morgan, Lewis & Bockius LLP (57) ABSTRACT A system and a method for controlling the number of pilot injections reduces combustion noise and improves fuel economy by deciding the actual number of the pilot injections based on a change amount of a driving condition and injecting a fuel according to the actual number of the pilot injections in a case of acceleration. The system may include a detecting portion detecting a driving condition of an engine; a control portion calculating a change amount of the driving condition from the driving condition of the engine, and deciding the actual number of the pilot injections based on the driving condition of the engine and the change amount of the driving condition; and an injector injecting a fuel to the engine through a main injection and/or the pilot injections according to the actual number of pilot injections.

6 Claims, 4 Drawing Sheets

(56) References Cited

U.S. PATENT DOCUMENTS

| | | | |
|---|---|---|---|
| 2003/0164166 A1* | 9/2003 | Takeuchi et al. | 123/674 |
| 2003/0233997 A1* | 12/2003 | Kawaguchi et al. | 123/299 |
| 2004/0050360 A1* | 3/2004 | Happenhofer et al. | 123/299 |
| 2005/0188945 A1* | 9/2005 | Dickerson et al. | 123/299 |
| 2007/0213919 A1* | 9/2007 | Magarida et al. | 701/102 |
| 2007/0240675 A1* | 10/2007 | Ban | 123/299 |
| 2008/0172169 A1* | 7/2008 | Kuronita et al. | 701/103 |
| 2008/0221780 A1* | 9/2008 | Ishikawa | 701/104 |
| 2009/0150045 A1* | 6/2009 | Iwashita et al. | 701/103 |
| 2009/0151697 A1* | 6/2009 | Hatano et al. | 123/435 |
| 2010/0088008 A1* | 4/2010 | Tanaka et al. | 701/104 |
| 2012/0060793 A1* | 3/2012 | Kim | 123/299 |

FOREIGN PATENT DOCUMENTS

| | | |
|---|---|---|
| EP | 1 933 021 A2 | 12/2007 |
| JP | 4122803 B2 | 5/2008 |

\* cited by examiner

SYSTEM AND METHOD FOR CONTROLLING THE NUMBER OF PILOT INJECTIONS

CROSS-REFERENCE TO RELATED APPLICATION

This application claims priority to and the benefit of Korean Patent Application No. 10-2010-0090132 filed in the Korean Intellectual Property Office on Sep. 14, 2010, the entire contents of which application is incorporated herein for all purposes by this reference.

BACKGROUND OF THE INVENTION

1. Field of the Invention

The present invention relates to a system and a method for controlling a fuel injection to an engine. More particularly, the present invention relates to a system and a method for controlling the number of pilot injections which reduces combustion noise and improves fuel economy by deciding the actual number of the pilot injections based on a change amount of a driving condition and injecting a fuel according to the actual number of the pilot injections in a case of acceleration.

2. Description of the Related Art

It is generally known that a diesel vehicle, compared with a gasoline vehicle, generates more soot and smoke and larger vibration/noise. A diesel particulate filter (DPF) is mounted at the diesel vehicle so as to reduce such soot and smoke, and multi-pilot injection is introduced in the diesel vehicle so as to reduce vibration/noise. In addition, various means for improving combustion is being introduced in the diesel vehicle.

Particularly, rigidity of the vehicle is strengthened and sound blocking and absorbing material is used in hardware aspect, and fuel injection factors such as injection pressure, injection timing, and fuel amount are determined according to engine speed and load, the fuel injection factors are corrected according to environmental variables (e.g., outer temperature, atmospheric pressure, and coolant temperature), and fuel injection is performed based on the corrected fuel injection factors in software aspect in order to reduce combustion noise of the diesel vehicle. In addition, the number of pilot injections is increased and increasing rate of combustion pressure is reduced so as to reduce combustion noise.

Figure 4:
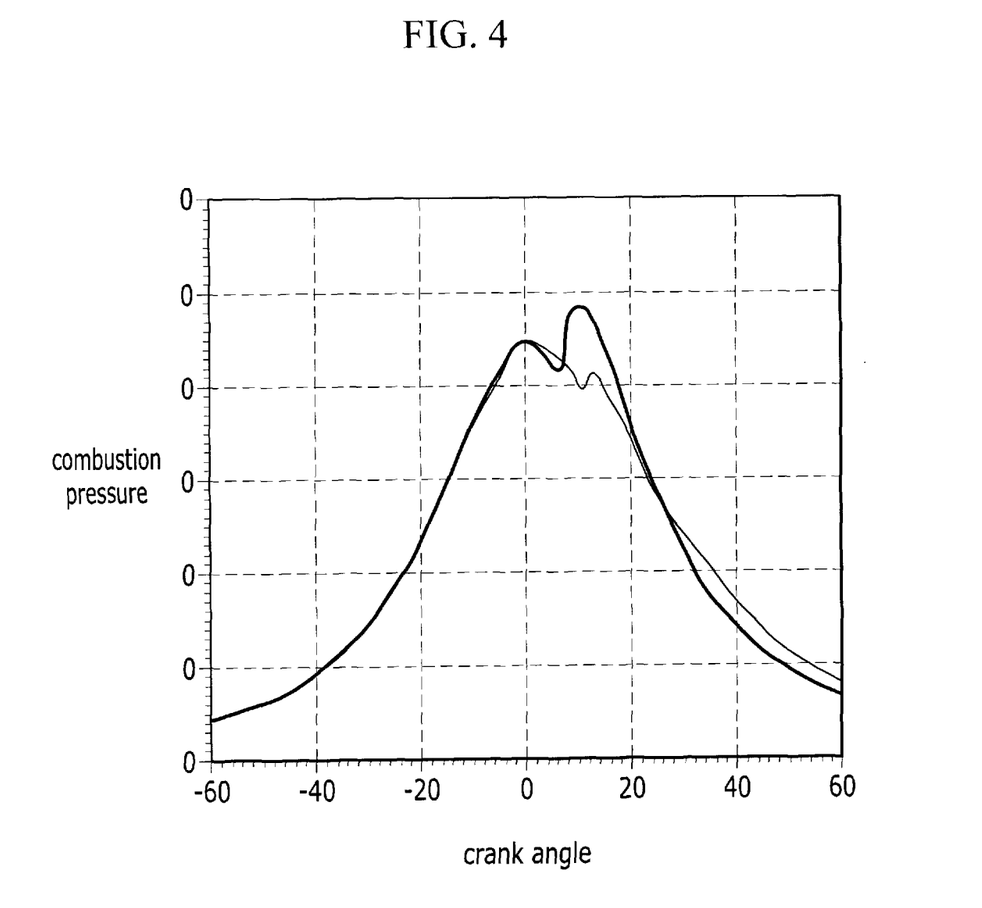
FIG. 4 is a graph showing combustion pressure to crank angle in a case that a fuel is injected through a main injection and through main injection/pilot injection.

FIG. 4 is a graph showing combustion pressure to crank angle in a case that a fuel is injected through a main injection and through main injection/pilot injection.

A bold line represents a case where a fuel is injected only through a main injection, and a fine line represents a case where the fuel is injected through main injection/pilot injection in FIG. 4.

The pilot injection creates combustion atmosphere (temperature in a combustion chamber is raised so as to improve mixture of fuel and air) before the main injection, and reduces ignition delay and the increasing rate of the combustion pressure caused by the main injection.

As shown in FIG. 4, if the fuel is injected through the main injection and the pilot injection, compared with a case where the fuel is injected only through the main injection, the combustion pressure, first derivative of the combustion pressure to time, and second derivative of the combustion pressure to time become smaller. As known to a person of an ordinary skill in the art, the combustion pressure influences the combustion noise at a low frequency region and first and second derivatives of the combustion pressure to time influence the combustion noise at high frequency region. Therefore, reducing the combustion pressure and first and second derivatives of the combustion pressure to time is very important for reducing the combustion noise, and this will be achieved by increasing the number of pilot injections.

Generally, the combustion noise occurs mainly when an initial acceleration. According to conventional arts, the number of pilot injections is decided according to a driving condition of an engine such as a throttle opening and an engine speed. However, a change amount of the driving condition of the engine is not reflected in the number of pilot injections. In addition, the number of pilot injections required at the initial acceleration should be different from that required at an end of acceleration under the same driving condition of the engine. That is, the number of pilot injections should be increased so as to create the combustion atmosphere at the initial acceleration, but the number of pilot injections should be reduced so as to enhance fuel economy at the end of acceleration.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a system and a method for controlling the number of pilot injections having advantages of reducing combustion noise and improving fuel economy by deciding the actual number of pilot injections according to a change amount of a driving condition and injecting a fuel according to the actual number of pilot injections when acceleration.

A system for controlling the number of pilot injections according to various aspects of the present invention may include a detecting portion detecting a driving condition of an engine, a control portion calculating a change amount of the driving condition from the driving condition of the engine, and deciding the actual number of the pilot injections based on the driving condition of the engine and the change amount of the driving condition, and an injector injecting a fuel to the engine through a main injection and/or the pilot injections according to the actual number of pilot injections.

The control portion may decide the reference number of the pilot injections according to the driving condition of the engine, a correction coefficient according to the change amount of the driving condition of the engine, and the actual number of the pilot injections from the reference number of the pilot injections and the correction coefficient.

The driving condition of the engine may include a throttle opening and an engine speed, and the change amount of the driving condition of the engine comprises at least one of a change amount of the throttle opening, a change amount of a fuel injection, a change amount of the engine speed, and a change amount of a vehicle speed.

The correction coefficient according to the change amount of the driving condition of the engine may be determined only when an acceleration condition is satisfied.

The actual number of the pilot injections may be determined by adding the correction number of the pilot injections that is determined by multiplying the correction coefficient and a weight value to the reference number of the pilot injections.

A method for controlling the number of pilot injections according to various aspects of the present invention may include detecting a driving condition of an engine, calculating a change amount of the driving condition of the engine, deciding the reference number of the pilot injections according to the driving condition of the engine, deciding a correction coefficient according to the change amount of the driving condition of the engine, deciding the actual number of the pilot injections based on the reference number of the pilot injections and the correction coefficient, and injecting a fuel to the engine through a main injection and/or the pilot injections according to the actual number of the pilot injections.

The driving condition of the engine may include a throttle opening and an engine speed, and the change amount of the driving condition of the engine comprises at least one of a change amount of the throttle opening, a change amount of a fuel injection, a change amount of the engine speed, and a change amount of a vehicle speed.

The correction coefficient according to the change amount of the driving condition of the engine may be determined only when an acceleration condition is satisfied.

The actual number of the pilot injections may be determined by adding the correction number of the pilot injections that is determined by multiplying the correction coefficient and a weight value to the reference number of the pilot injections.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A system and a method according to various embodiments of the present invention control an injection of a fuel to an engine. According to various embodiments of the present invention, the fuel is supplied to the engine through a main injection and/or a pilot injection. Generally, the number of the main injection is 1, but the number of the pilot injections changes according to a driving condition of an engine and a change amount of the driving condition during a fuel injection cycle. That is, the fuel is supplied to the engine according to the driving condition of the engine and the change amount of the driving condition through only the main injection, the main injection and one pilot injection, the main injection and two pilot injections, or the main injection and at least three times of pilot injections.

In addition, the fuel injection to the engine is controlled by deciding the number of pilot injections. That is, the number of the main injection is 1, and the number of pilot injections changes during one fuel injection.

Figure 1:
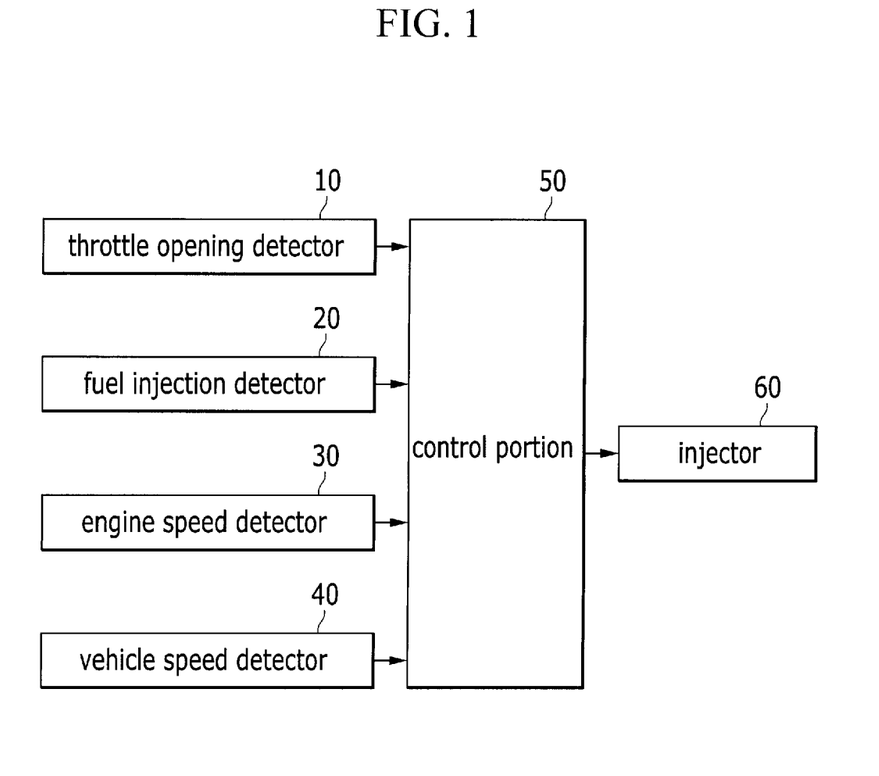
FIG. 1 is a block diagram of an exemplary system for controlling the number of pilot injections according to the present invention.

As shown in FIG. 1, a system for controlling the number of pilot injections according to various embodiments of the present invention may include a throttle opening detector 10, a fuel injection detector 20, an engine speed detector 30, a vehicle speed detector 40, a control portion 50, and an injector 60.

The throttle opening detector 10 detects an opening of a throttle valve (not shown) operated according to an operation of an accelerator pedal, and transmits a signal corresponding thereto to the control portion 50. Instead of the throttle opening detector 10, an accelerator pedal position detector may be used.

The fuel injection detector 20 detects a fuel amount injected by the injector 60, and transmits a signal corresponding thereto to the control portion 50. Since the fuel amount injected by the injector 60 is determined from a predetermined map according to the driving condition of the engine, the control portion 50 may directly calculate the fuel amount injected to the engine instead of using the fuel injection detector 20.

The engine speed detector 30 detects a rotation speed of the engine from a phase change of a crankshaft, and transmits a signal corresponding thereto to the control portion 50.

The vehicle speed detector 40 is mounted at a wheel (not shown) of a vehicle. The vehicle speed detector 40 detects a rotation speed of the wheel, calculates a vehicle speed from the rotation speed of the wheel, and transmits a signal corresponding thereto to the control portion 50.

The control portion 50 receives the signals corresponding to the driving condition of the engine such as the throttle opening, the fuel injection amount, the engine speed, and the vehicle speed, and decides the reference number of pilot injections according to the driving condition of the engine. Similar to conventional arts, the reference number of pilot injections according to the throttle opening and the engine speed is predetermined in a map according to various embodiments of the present invention. Therefore, if the control portion 50 receives the signals corresponding to the throttle opening and the engine speed, the control portion 50 decides the reference number of pilot injections from the predetermined map.

In addition, the control portion 50 calculates the change amount of the driving condition, and decides correction coefficients according to the change amount of the driving condition of the engine and the actual number of pilot injections based thereon. For this purpose, the control portion 50 includes a predetermined correction coefficient map in which the correction coefficients according to the change amount of the driving condition of the engine is stored and a predetermined weight value map in which weight values for the change amount of each driving condition is stored.

The injector 60 injects the fuel to the engine according to the actual number of pilot injections determined by the control portion 50. As described above, the fuel injection is performed through the main injection and/or the pilot injections. Structure of the injector 60 is well known to a person of an ordinary skill in the art, and thus, detailed description thereof will be omitted.

Figure 2:
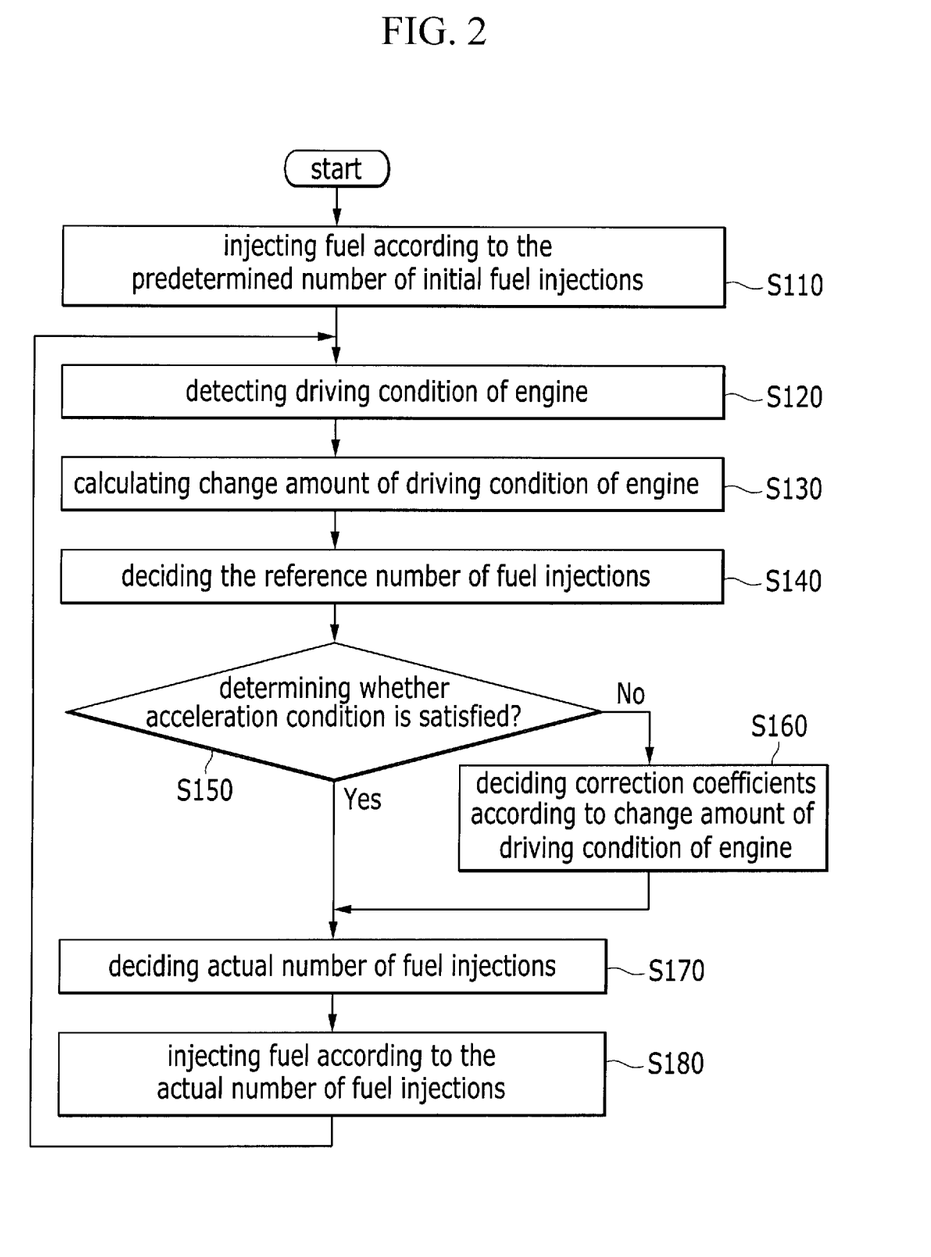
FIG. 2 is a flowchart of an exemplary method for controlling the number of pilot injections according to the present invention.

As shown in FIG. 2, if the engine starts, the control portion 50 controls the injector 60 to inject the fuel according to the predetermined number of initial fuel injections at a step S110. Since the fuel injection is performed through the main injection and/or the pilot injection as described above, the number of fuel injection is calculated by adding 1 to the number of pilot injections.

In a state that the fuel is injected according to the predetermined number of initial fuel injection, the detecting portion 10, 20, 30, and 40 detects the driving condition of the engine in order to understand a driver's intention at a step S120, and the control portion 50 calculates the change amount of the driving condition of the engine from the detected driving condition of the engine at a step S130. The change amount of the driving condition of the engine is calculated by subtracting a previous driving condition of the engine from a current driving condition of the engine and dividing a difference of the driving condition by an elapsed time.

After that, the control portion 50 decides the reference number of the fuel injections according to the driving condition of the engine at a step S140. Since the reference number of the fuel injections according to the throttle opening and the engine speed is predetermined in a map, the detecting portion 10, 20, 30, and 40 transmits the signals corresponding to the throttle opening and the engine speed to the control portion 50, and the control portion 50 decides the reference number of pilot injections from the predetermined map.

If the reference number of fuel injections is determined, the control portion 50 determines whether an acceleration condition is satisfied at a step S150. The acceleration condition may be satisfied when the throttle opening increases.

If the acceleration condition is not satisfied at the step S150, the control portion 50 decides the reference number of fuel injections as the actual number of fuel injections at a step S170, and injects the fuel according to the actual number of fuel injections at a step S180.

If the acceleration condition is satisfied at the step S150, the control portion 50 decides the correction coefficients according to the change amount of the driving condition of the engine at a step S160. If the driving condition of the engine (i.e., throttle opening and engine speed) at the initial acceleration is the same as that at the end of the acceleration, the fuel is injected through the same number of pilot injections according to a conventional method for controlling the number of fuel injection. Since much power is required at the initial acceleration, the many number of pilot injections is required. However, since less power is required at the end of the acceleration, the few number of pilot injections is required. Considering this point, various embodiments of the present invention improve conventional method for controlling the number of fuel injections in which the number of fuel injections is constant according to the driving condition of the engine and corrects the number of fuel injections according to the change amount of the driving condition of the engine. [Table 1] to [Table 4] show examples of the maps in which the correction coefficients according to the change amount of the driving condition of the engine is set.

TABLE 1 correction coefficient according to change amount of throttle opening

| | Change amount of throttle opening | | | | | | | | |
|---|---|---|---|---|---|---|---|---|---|
| | under 0 | 10 | 20 | 30 | 40 | 50 | 60 | 70 | over 80 |
| Correction coefficient K1 | 2 | 2 | 2 | 2 | 2 | 2 | 2 | 3 | 3 |

TABLE 2 correction coefficient according to change amount of fuel

| | Change amount of fuel | | | | | | | | |
|---|---|---|---|---|---|---|---|---|---|
| | under 0 | 10 | 15 | 20 | 25 | 30 | 35 | 40 | over 45 |
| Correction coefficient K2 | 2 | 2 | 2 | 2 | 3 | 3 | 3 | 3 | 3 |

TABLE 3 correction coefficient according to change amount of engine speed

| | Change amount of engine speed | | | | | | | | |
|---|---|---|---|---|---|---|---|---|---|
| | under −150 | −75 | 0 | 37.5 | 75 | 112.5 | 150 | 225 | over 300 |
| Correction coefficient K3 | 2 | 2 | 2 | 2 | 2 | 2 | 2 | 3 | 3 |

TABLE 4 correction coefficient according to change amount of vehicle speed

| | Change amount of vehicle speed | | | | | | | | |
|---|---|---|---|---|---|---|---|---|---|
| | under 0 | 1.25 | 2.5 | 3.75 | 5 | 7.5 | 10 | 12.5 | over 15 |
| Correction coefficient K4 | 2 | 2 | 2 | 2 | 2 | 2 | 2 | 3 | 3 |

It is exemplified herein that the change amount of the throttle opening, the change amount of the fuel, the change amount of the engine speed, and the change amount of the vehicle speed are used as the change amount of the driving condition of the engine, but the scope of the present invention is not limited to this. In addition, the control portion 50 may decide all or some of the correction coefficient K1 according to the change amount of the throttle opening, the correction coefficient K2 according to the change amount of the fuel, the correction coefficient K3 according to the change amount of the engine speed, and the correction coefficient K4 according to the change mount of the vehicle speed.

After that, the control portion 50 decides the actual number of fuel injections based on the reference number of fuel injections and the correction coefficients K1, K2, K3, and K4 at a step S170.

If the reference number of fuel injections is X1, and weight values for the change amount of each driving condition are W1, W2, W3, and W4, the actual number of fuel injections X2 is calculated as follows.

Firstly, a correction reference S is calculating by multiplying each correction coefficient and the corresponding weight value as follows.

$$S = K1*W1 + K2*W2 + K3*W3 + K4*W4 \quad \text{Eq. (a)}$$

Herein, weight values W1, W2, W3, and W4 for the change amount of each driving condition may be predetermined as a map according to the driving condition of the engine or may be predetermined as a constant value so as to obtain performance which engine designers wish After that, the corrected number of fuel injections X3 is calculated by comparing the correction reference S with predetermined values S1, S2, S3, and S4.

For example, the corrected number of fuel injections X3 is set to 0 if the correction reference S is between a first predetermined value S1 and a second predetermined value S2, the corrected number of fuel injections X3 is set to 1 if the correction reference S is between the second predetermined value S2 and a third predetermined value S3, and the corrected number of fuel injections X3 is set to 2 if the correction reference S is between the third predetermined value S3 and a fourth predetermined value S4.

After that, the actual number of fuel injections X2 is calculated by adding the reference number of fuel injections X1 and the corrected number of fuel injections X3.

Finally, the control portion 50 controls the injector 60 to inject the fuel to the engine according to the actual number of fuel injections.

Meanwhile, the steps S110 to S180 are repeated while the engine runs.

Figure 3:
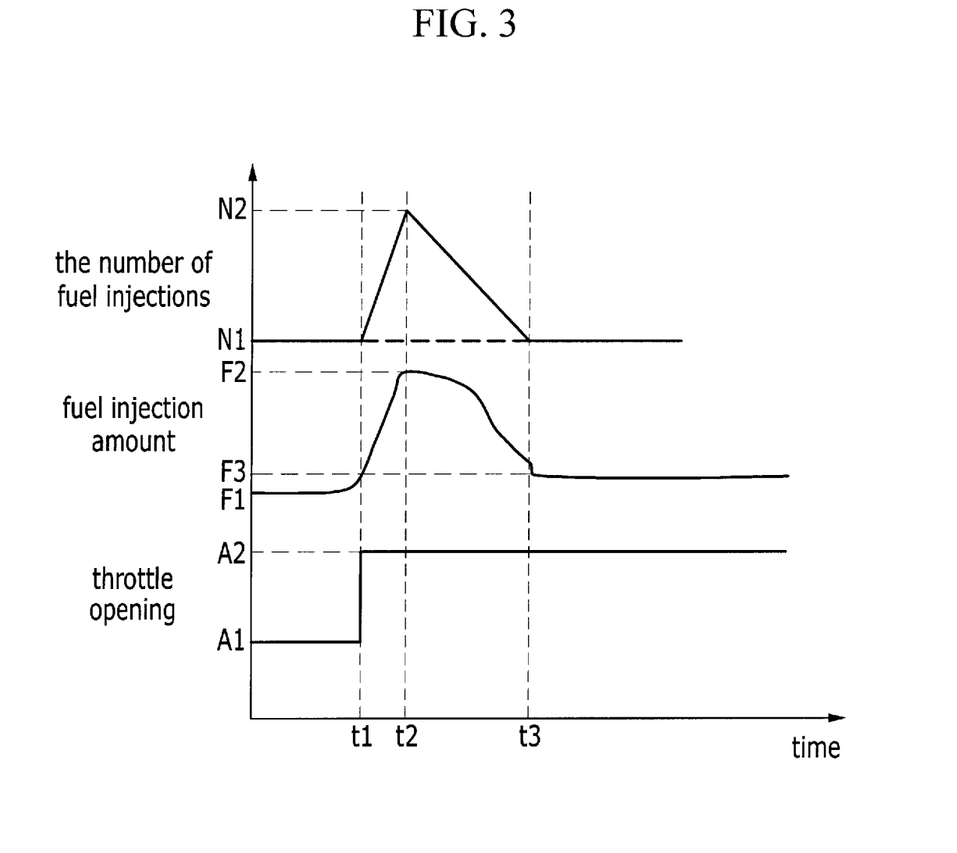
FIG. 3 is a schematic diagram for explaining an exemplary method for controlling the number of pilot injections according to the present invention.

As shown in FIG. 3, in a state that the throttle opening is a first throttle opening A1, the fuel injection amount is set to a first fuel injection amount F1 and the number of fuel injections is set to the first number of fuel injections N1. If the driver pushes the accelerator pedal for acceleration, the throttle opening is changed from the first throttle opening A1 to the second throttle opening A2.

At this time, the control portion 50 decides a reference fuel injection amount according to the driving condition of the engine, a corrected fuel injection amount according to the change amount of the driving condition of the engine, and an actual fuel injection amount based on the reference fuel injection amount and the corrected fuel injection amount. In addition, the control portion 50 decides the reference number of fuel injections according to the driving condition of the engine, the correction coefficients according to the change amount of the driving condition of the engine, and the actual number of fuel injections based on the reference number of fuel injections and the correction coefficients.

In FIG. 3, the change amount of the driving condition of the engine is large because of the acceleration from a first time t1 to a second time t2. Therefore, the fuel injection amount is increased to a second fuel injection amount F2 and the number of fuel injections is increased to the second number of fuel injection N2 from the first time t1 to the second time t2. After that, the fuel injection amount is reduced to a third fuel injection amount F3 and the number of fuel injections is decreased to the first number of fuel injections N1 (i.e., the reference number of fuel injections set according to the driving condition of the engine) from the second time t2 to a third time t3 when the change amount of the driving condition of the engine decreases. Since the change amount of the driving condition of the engine is 0 after the third time t3, the fuel is injected according to the reference fuel injection amount (the same as the third fuel injection amount F3) and the reference number of fuel injections (the same as the first number of fuel injections N1).

Conventionally, if the driver pushes the accelerator pedal, the number of fuel injections is quickly increased to and is maintained at the second number of fuel injections N2. However, if the driver pushes the accelerator pedal, the number of fuel injections is gradually increased to the second number of fuel injections N2 at the initial acceleration, but the change amount of the driving condition is reduced and the number of fuel injections is also reduced to the first number of fuel injections N1 at the end of acceleration according to various embodiments of the present invention. Therefore, fuel economy may improve.

In addition, since the number of pilot injections is increased at the acceleration, the combustion pressure and the first and second derivatives of the combustion pressure to the time may be reduced and the combustion noise may also be reduced.

As described above, since the number of pilot injections is determined according to the change amount of the driving condition and the fuel is injected according to the number of pilot injections when acceleration, combustion noise may be reduced according to the present invention.

In addition, since the fuel is injected according to the optimized number of pilot injections, fuel economy may improve.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling the number of pilot injections, comprising:
    a detecting portion configured for detecting a driving condition of an engine;
    a control portion determining a change amount of the driving condition from the driving condition of the engine, and determining an actual number of the pilot injections based on the driving condition of the engine and the change amount of the driving condition; and
    an injector injecting a fuel to the engine through a main injection and/or the pilot injections according to the actual number of pilot injections;
    wherein the control portion decides a reference number of the pilot injections according to the driving condition of the engine, a correction coefficient according to the change amount of the driving condition of the engine, and the actual number of the pilot injections from the reference number of the pilot injections and the correction coefficient, and
    wherein the actual number of the pilot injections is determined by adding a correction number of the pilot injections that is determined by multiplying the correction coefficient and a weight value to the reference number of the pilot injections.

2. The system of claim 1, wherein the driving condition of the engine comprises a throttle opening and an engine speed, and the change amount of the driving condition of the engine comprises at least one of a change amount of the throttle opening, a change amount of a fuel injection, a change amount of the engine speed, and a change amount of a vehicle speed.

3. The system of claim 1, wherein the correction coefficient according to the change amount of the driving condition of the engine is determined only when an acceleration condition is satisfied.

4. A method for controlling the number of pilot injections, comprising:
- detecting a driving condition of an engine;
- calculating a change amount of the driving condition of the engine;
- determining a reference number of the pilot injections according to the driving condition of the engine;
- determining a correction coefficient according to the change amount of the driving condition of the engine;
- determining an actual number of the pilot injections based on the reference number of the pilot injections and the correction coefficient; and
- injecting a fuel to the engine through a main injection and/or the pilot injections according to the actual number of the pilot injections, wherein the actual number of the pilot injections is determined by adding a correction number of the pilot injections that is determined by multiplying the correction coefficient and a weight value to the reference number of the pilot injections.

5. The method of claim 4, wherein the driving condition of the engine comprises a throttle opening and an engine speed, and the change amount of the driving condition of the engine comprises at least one of a change amount of the throttle opening, a change amount of a fuel injection, a change amount of the engine speed, and a change amount of a vehicle speed.

6. The method of claim 4, wherein the correction coefficient according to the change amount of the driving condition of the engine is determined only when an acceleration condition is satisfied.

* * * * *